United States Patent

[11] 3,552,526

| [72] | Inventors | Friedrich Beuchle;<br>Heinz Hahm, Frankfurt am Main Hans Christof Klein, Hattersheim am Main; Hans Albert Beller, Bad Vilbel, Germany |
|---|---|---|
| [21] | Appl. No. | 827,186 |
| [22] | Filed | May 23, 1970 |
| [45] | Patented | Jan. 5, 1971 |
| [73] | Assignee | Alfred Teves GmbH<br>Frankfurt am Main, Germany<br>a corporation of Germany |
| [32] | Priority | Jan. 28, 1967, Jan. 28, 1967, Jan. 28, 1967, Jan. 28, 1967, Jan. 28, 1967, Jan. 28, 1967, Jan. 28, 1967, Jan. 28, 1967, Jan. 28, 1967, Feb. 17, 1967 |
| [33] | | Germany |
| [31] | | T33,098, T33,099, T33,100, T33,101, T33,102, T33,103, T33,104, T33,105, T33,106, T33,107, and T33,229<br>Continuation-in-part of Ser. No. 699,203, Jan. 19, 1968, now Patent No. 3,477,551. |

[54] BRAKESHOE CONSTRUCTION FOR DISK BRAKES
3 Claims, 5 Drawing Figs.

[52] U.S. Cl. .................................................. 188/73.1; 188/250
[51] Int. Cl. ................................................... F16d 65/02
[50] Field of Search ......................................... 188/250A7, 250B

[56] References Cited
UNITED STATES PATENTS

| 3,072,221 | 1/1963 | Peros ............................. | 188/73 |
| 3,378,116 | 4/1968 | Hennig .......................... | 188/250(B) |

FOREIGN PATENTS

| 254,404 | 7/1927 | Italy ............................... | 188/250(A7) |
| 598,863 | 10/1959 | Italy ............................... | 188/250(B) |

*Primary Examiner*—George E. A. Halvosa
*Attorney*—Karl F. Ross

ABSTRACT: A brakeshoe construction for a disc brake in which a brake lining of ceramic or ceramiclike material is surrounded in whole or in part by a frame into the opening or window of which the brake lining extends. The frame surrounds a large step milled into the lining material. Guide apertures for the guide rods of a disc brake are formed integrally by lugs of the frame or web or are located within the frame.

INVENTORS:
FRIEDRICH BEUCHLE
HEINZ HAHM
HANS CHRISTOF KLEIN
HANS A. BELLER

BY Karl G. Ross
ATTORNEY

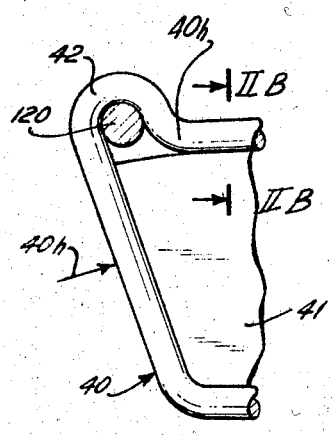
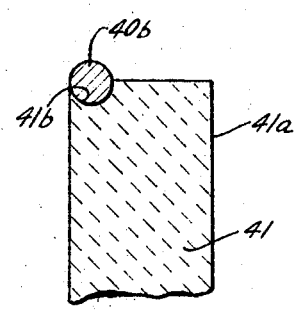
FIG. 2A
FIG. 2B
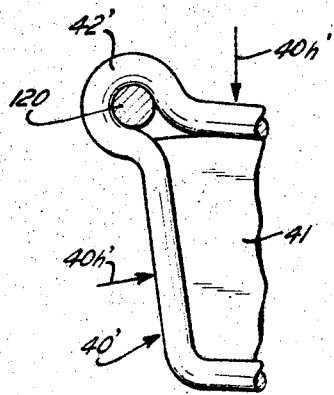
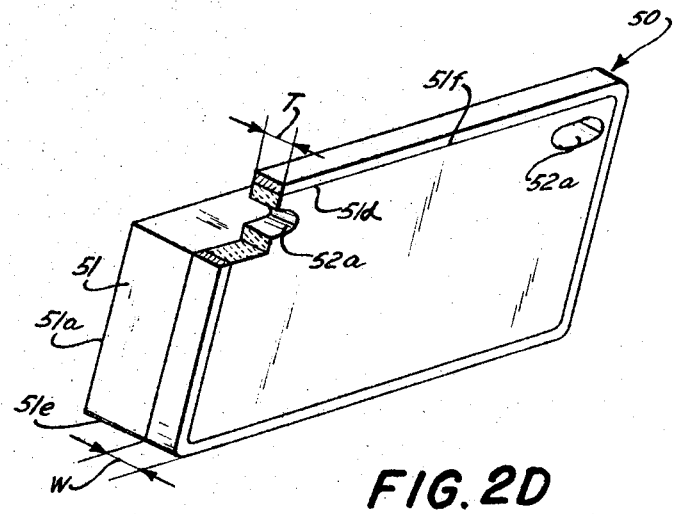
FIG. 2C
FIG. 2D

BRAKE SHOW CONSTRUCTION FOR DISK BRAKES

This application is a continuation-in-part of our application Ser. No. 699,203 filed 19 Jan. 1968, now U.S. Pat. No. 3,477,551.

Our present invention relates to a brakeshoe construction for disc-type brakes and, more particularly, to a brakeshoe which comprises a brake lining of high frictional coefficient, low wear and good resistance to moisture and oil, mounted upon a backing plate or lining carrier.

Disc-type brakes have gained increasing prominence in recent years as a result of their improved response, the low volume of fluid which must be displaced by the master cylinder to actuate them, and the rapidity with which they are able to bring a vehicle to standstill. In general, a disc brake for automotive vehicle application comprises a brake disc which is rotatably entrained with a wheel of the vehicle, e.g. by being mounted upon the tire-carrying wheel disc or upon the axle shaft of a wheel, and a brake housing in the form of a U-shaped yoke extending around the periphery of the disc and connected with a relatively stationary part of the vehicle structure. This part may be an axle housing, some other portion of the suspended chassis or the vehicle body or the chassis itself.

The yoke, which may be axially shiftable in a direction perpendicular to the opposite annular braking faces of the disc or may be fixed with respect to movement in this direction, is provided with a pair of brakeshoes confronting the respective braking faces and thus flanking the disc while being movable perpendicularly to these braking faces and parallel to the axis of rotation of the disc. Such movement may be independent of movement of the brake yoke or may be a consequence of the axial movement thereof. To actuate the brakeshoes, one or more wheel-brake cylinders can be provided in the brake yoke with corresponding pistons individual to the brakeshoes and adapted to bear directly against the latter to apply the brakeshoes to the disc. The brakeshoes are dimensioned to occupy only a minor segment of the total annular extent of the respective braking face and thus may be considered as segmental or spot-type brakeshoes by contrast with other disc-brake systems in which annular brakeshoes may be employed. The hydraulic fluid necessary to supply the wheel-brake cylinders is delivered by a master cylinder actuated by the brake pedal. In some cases, only a single wheel-brake cylinder is provided, this cylinder receiving a piston which bears against one of the brakeshoes to urge the latter directly against the disc and thus bears upon this brakeshoe.

Since the brake lining is selected in accordance with its frictional characteristic, its erosion resistance and its insensitivity to moisture and other contaminants, its rigidity or mechanical strength may be insufficient alone to withstand the compressive force applied over limited areas by the brake-actuating means, namely the wheel-brake piston or force-transmitting member. Accordingly, prior-art brakeshoes have generally comprised a massive cast-iron or steel backing plate to which an organic-based or inorganic lining was bonded, the piston or the force-transmitting member bearing against the backing plate. The bonding was effected by rivets or the like. In still other arrangements, dovetail formations were provided on the lining and backing plate to withstand the stresses developed between lining and backing plate during the brake-application step. It will be appreciated that, when the backing plate is guided in the brake yoke or housing and prevented from lateral movement by this housing, and the lining frictionally engages the disc a significant shear force develops at the interface between the lining and the backing plate. As a practical matter, earlier methods of securing the lining to the backing plate have been unsatisfactory, to a large measure, because of inability to withstand these shear stresses.

It is, therefore, the principal object of the present invention to provide an improved brakeshoe construction in which the aforementioned disadvantages can be obviated.

Another object of our invention is to provide a brakeshoe construction, extending the principles of our earlier application mentioned above, in which the shear stress between the braking surface of the brakeshoe and the surface to which the piston applies pressure is distributed to prevent damage to the latter.

As described in the above-identified application Ser. No. 699,203, these objects and others, which will become apparent hereinafter, are attained in accordance with the present invention in a brakeshoe construction for a disc-type brake which provides a peripheral metal rim extending around the periphery of the brake lining and of a width equal only to a fraction of the thickness of the lining layer and integral (i.e. formed unitarily and in one piece) with a pair of eyes by which the brakeshoe is guided in its motion perpendicularly to these braking faces of the disc. Advantageously, the rim is drawn unitarily and integrally from a backing plate of the same metal and identical thickness so that the brake-lining support has a boxlike configuration and forms a cavity over substantially the entire area of the lining into which the latter is fitted. Along the rim, however, a marginal strip of the brake lining, whose lateral extent is equal substantially to the thickness of the metal forming the rim, can overhang the latter. The total thickness of the lining is thus equal to the depth of the boxlike casing formed by the backing plate plus the thickness of this marginal portion. The eyes, in this embodiment, are apertures punched, drilled or stamped from the planar web forming the base of the boxlike casing and from which the rim extends in the form of a preferably continuous peripheral flange. In the region of the eyes, however, the rim may be flattened and broken to accommodate the eyes. Where the rim is overhung by the brake lining, the lining is in effect embedded in the boxlike support. Advantageously, the rim extends transversely to the web by a distance of at least several thicknesses of the sheet metal composing the carrier and a substantial fraction of the thickness of the lining, e.g. between one-eighth and one-half the latter thickness. Preferably a frame surrounds the brake lining, which advantageously here is a self-supporting material of significant rigidity, e.g. a sintered metal or, preferably, a ceramic or ceramiclike material such as a cermet. The frame here may be constituted unitarily from a spring wire which is deflected outwardly against its inherent inward resilience to receive the lining body. The eyes are here formed as loops of the frame, preferably as corners thereof. The wire may have a circular cross section. When, however, a steel band forms the frame material, the loops may be similarly constituted although a rigid brake lining filling the frame, when composed of a ceramic or a ceramiclike material, may be provided with openings forming the eyes and surrounded by the metal frame. In this case, the brake-contacting portion of the lining is constituted as a step of smaller surface areas than the rearward step whose thickness corresponds to the width of the metal band and frame and is formed with holes constituting the eyes.

As indicated earlier, the invention is particularly designed for use with rigid brake-lining materials such as ceramic or ceramiclike substances, the lining carrier being composed of sheet steel, steel wire or steel mesh with a thickness of 1.5 to 2 mm. Such carriers have the advantage that they wear, in sliding engagement with guide pins, thereby avoiding destruction of a permanent part of the brake structure. The eyes may, in order to preclude tearing, be bounded along their upper side by the inner surface of an inwardly turned rim flange. Typical ceramic materials for the present purposes are silicates, alumina-silicate, alumina-magnesia-silica composites and cermets of the type indicated earlier.

The above and other objects, features and advantages of the present invention will become more readily apparent from the following description, reference being made to the accompanying drawing in which:

FIG. 2A is a fragmentary elevational view of a brakeshoe provided with a spring-wire frame;

FIG. 2B is a detail cross-sectional view along the line IIB—IIB of FIG. 2A;

FIG. 2C is a view similar to FIG. 2A showing another embodiment; and

FIG. 2D is a perspective view diagrammatically illustrating a brakeshoe in which the eye is formed in the larger step of a stepped brake lining.

Figure 1:
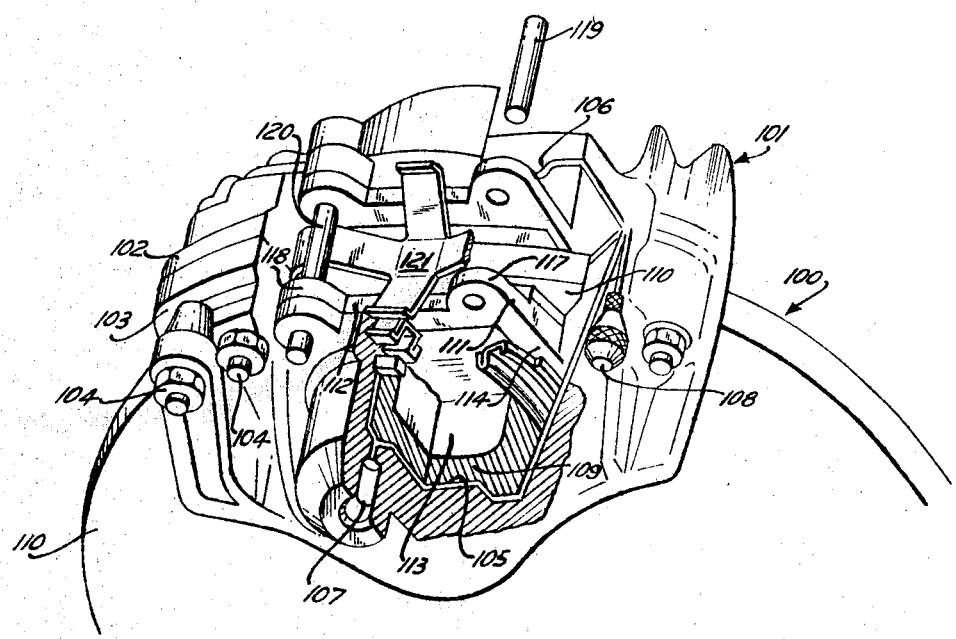
FIG. 1 is a perspective view, partly broken away, of a disc brake showing the relationship of the brakeshoes to the guide pins.

In FIG. 1, we show diagrammatically a disc brake whose disc 100 may be coupled with a wheel or wheel shaft of an automotive vehicle and which cooperates with a brake yoke or housing 101 to halt the vehicle. This housing, which is made up of a pair of yoke halves 102 and 103, which are interconnected by bolts 104, is secured to an axial housing (not shown) which is stationary with respect to the axis of rotation of the disc 100.

Each of the yoke halves is formed with a respective cylinder 105, 106 into which brake fluid is fed, e.g. via the feeding 107. When necessary, the brake cylinders may be bled of air via the valve 108.

In each of the wheel-brake cylinders, e.g. as shown for cylinder 105, a piston 109 is axially shiftable perpendicularly to the respective annular braking face 110 of the disc 100 to urge a brakeshoe 111 against this disc.

The brakeshoe 111 is here shown to have a carrier frame 112 (see FIGS. 2A—2D) and a ceramic or ceramiclike lining 113 mounted in this carrier. The frame 114 is integrally and unitarily formed with a pair of eyes 117 and 118 which are axially shiftable along guide rods 119 and 120, the former having been withdrawn to reveal the interior of the brake structure. These rods, which extend perpendicularly to the disc 100 and parallel to its axis of rotation, bridge the yoke halves and ensure proper orientation of the brakeshoes during application of the brake. A clip 121 may be provided to urge the brakeshoes apart. When brake fluid is fed to the cylinders, the pistons apply the brakeshoes to the cylinders and terminate rotation of the latter.

The embodiments represented in FIGS. 2A and 2B provide a frame 40 which may be spanned with an openwork structure as illustrated and described in the aforementioned copending application, the frame surrounding the brake lining 41 along its entire periphery and functioning as an equivalent to rim flanges. In this embodiment, however, the circular-section wire 40b forming the frame extends endlessly around the lining body 41 of sintered ceramic material and is composed of steel spring wire which bears inwardly as represented by the arrows 40h upon the periphery of the lining 41. The latter has a peripheral groove 41b partly receiving the wire 40b. The braking face of the shoe is represented at 41a and is spaced ahead of the wire frame 40 by the major part of the thickness of the lining. In this case, the brakeshoe is shown to be trapezoidal and to have ear-shaped lugs 42 deformed unitarily from the wire. The shape of these lugs is such that the wire 40 hugs the guide rods 120 (see FIG. 1) over at least 180° of its circumference. Approximately 270° of enclosure is provided in the arrangement of FIG. 2C, FIG. 2D thus provides a modified lug 42' in the frame 40' which bears inwardly as represented by the arrows 40h' upon the rigid lining body 41.

In FIG. 2D, the frame 50 is composed of an endless steel band which peripherally surrounds the large step 51d of the rigid ceramic lining 51 whose braking surface 51a has a smaller area and thus is provided on the smaller step 51e of this stepped brake lining. The steps 51d and 51e are so arranged that merely a flange 51f of the brake lining is formed, this flange projecting beyond the step 51e toward the guide rods and being formed with the guide opening 52a. The frame 50 extends closely around the periphery of the flange 51f to reinforce the wires of this opening. In this system, use can be made of other brake lining materials, especially the asbestos-fiber reinforced laminate commercially developed as brake-lining materials. The step 51e is formed by milling away the lining body. In all cases, however, the frame 50 should have a width W equal to the thickness T of the larger step.

The invention described and illustrated is believed to admit of many modifications within the ability of persons skilled in the art.

We claim:

1. A brakeshoe for a disc brake, comprising a generally planar body of a rigid self-supporting brake-lining material having a braking face juxtaposable with the disc of the disc brake and a rearward face remote therefrom and juxtaposable with a brake actuator, said body being unitarily and monolithically formed with a first step extending over the entire outline of said body and defining said rearward face and a second step extending over a major fraction of the area enclosed within said outline and defining said braking face; and a metal frame extending continuously about said first step and flush with said rearward face and with the flanks of said second step while having a width equal substantially to the thickness of said first step, said first step being formed with a pair of quide openings inwardly of said frame for receiving guide rods of said disc brake.

2. A brakeshoe for a disc brake, comprising a generally planar body of a rigid self-supporting brake-lining material and having four edges defining the outline of said body, a braking face juxtaposable with a brake disc, and a rearward face juxtaposable in a brake actuator; a frame peripherally surrounding said body and recessed in all of said edges flush with said rearward face and consisting of a one-piece circular section rod bent to conform to the outline of said body and of a diameter less than the thickness thereof between said faces, said frame being unilaterally deformed to provide a pair of guide lugs extending away from one of said edges and of circular segmental configuration and extending over at least an arc ranging upwards of about 180°, said frame bearing inwardly under inherent resilience against said body and being composed of spring wire.

3. The brakeshoe defined in claim 2 wherein said body is composed of a ceramic, said frame is composed of steel and said body is of substantially trapezoidal configuration.